United States Patent [19]

Washizuka et al.

[11] Patent Number: 4,603,396
[45] Date of Patent: Jul. 29, 1986

[54] GRAPHIC PRINTER WITH AUTOMATIC SCALE INFORMATION SETTING DEVICE

[75] Inventors: Isamu Washizuka; Mitsuhiro Saiji, both of Kyoto, Japan

[73] Assignee: Sharp Kabushiki Kaisha, Osaka, Japan

[21] Appl. No.: 467,666

[22] Filed: Feb. 18, 1983

[30] Foreign Application Priority Data

Feb. 26, 1982 [JP] Japan ................................ 57-30820

[51] Int. Cl.⁴ ........................ G01D 9/38; G01D 18/00; G06K 15/22
[52] U.S. Cl. .................................... 364/520; 364/518
[58] Field of Search ................ 346/46, 29; 364/518, 364/520, 200, 900; 318/557

[56] References Cited

U.S. PATENT DOCUMENTS

| | | | |
|---|---|---|---|
| 3,711,717 | 11/1973 | Rich et al. | 318/577 |
| 3,936,712 | 2/1976 | Gerber et al. | 318/577 |
| 3,982,165 | 8/1976 | Rich | 318/577 |
| 4,058,849 | 11/1977 | Fitzgerald et al. | 364/900 |
| 4,135,245 | 1/1979 | Kemplin et al. | 364/520 |
| 4,313,073 | 1/1982 | Yamamoto et al. | 318/577 |
| 4,322,816 | 3/1982 | Spangler et al. | 364/900 |
| 4,346,445 | 8/1982 | Leuenberger et al. | 364/520 |
| 4,364,056 | 12/1982 | Suzuki et al. | 346/29 |
| 4,435,772 | 3/1984 | Suzuki et al. | 364/520 |

OTHER PUBLICATIONS

W. J. Dixon and R. A. Kronmal, *Journal of the Association for Computing Machinery*, vol. 12, No. 2 (Apr., 1965), pp. 259–261.

T. Giammo, *Journal of the Association for Computing Machinery*, vol. 11, No. 1 (Jan., 1964), pp. 79–83.

*Primary Examiner*—Felix D. Gruber
*Attorney, Agent, or Firm*—Birch, Stewart, Kolasch & Birch

[57] ABSTRACT

Disclosed hereinbelow is an automatic graphic printer which is characterized in that; it automatically sets the scale information of the graphic axes as a function of the sample data value, and therefore, even if designation of an information related to complex scales is deleted, such a scale information based on the sample data can be automatically set, and as a result, any of the conventional graphs can be drawn within a shorter period of time than before by using simplified designation means. In addition, plotting position of the sample data can be set in any suitable position on the graph so that an optimum scale can easily be provided.

2 Claims, 12 Drawing Figures

GRAPHIC PRINTER WITH AUTOMATIC SCALE INFORMATION SETTING DEVICE

BACKGROUND OF THE INVENTION

The present invention relates to a graphic printer that automatically prints a graph using a plurality of parameters and data being input.

Conventionally, many of the existing graphic printers print out graphs on the X—Y plotters using a variety of parameters and input data.

Taking a circular graph for example, the centralized co-ordinate or the circle radius is input as a parameter, and then a variety of input data so that a circular graph of the input data can be automatically drawn up. Using such a device, either a bar graph or a line graph can also be automatically drawn up. Such a conventional graphic printer, however, needs to minutely designate positions of the graphic scales, and as a result, the operator could not easily draw up such a graph.

OBJECT AND SUMMARY OF THE INVENTION

In the light of such inconvenient characteristics prevailing in the existing graphic printers, the present invention aims to provide an automatic graphic printer that can automatically set scales in optimum positions without specifying particular data related to the graphic scales.

The automatic graphic printer embodied by the present invention is characterized in that; the automatic graphic printer is capable of automatically drawing a graph by using a plurality of parameters and input data, while the scale data of the graphic axis is automatically provided as a function of the sample data.

According to the present invention, even though the specification of such a data related to complex scales is deleted, since the scale data based on the sample data can be automatically set by means of the scale data designated, any conventional graphs can be drawn up within a very short time. Sample data can be plotted on any suitable position of a graph needed, where an optimum scale can easily be set.

DETAILED DESCRIPTION OF THE INVENTION

Figures 1, 2:
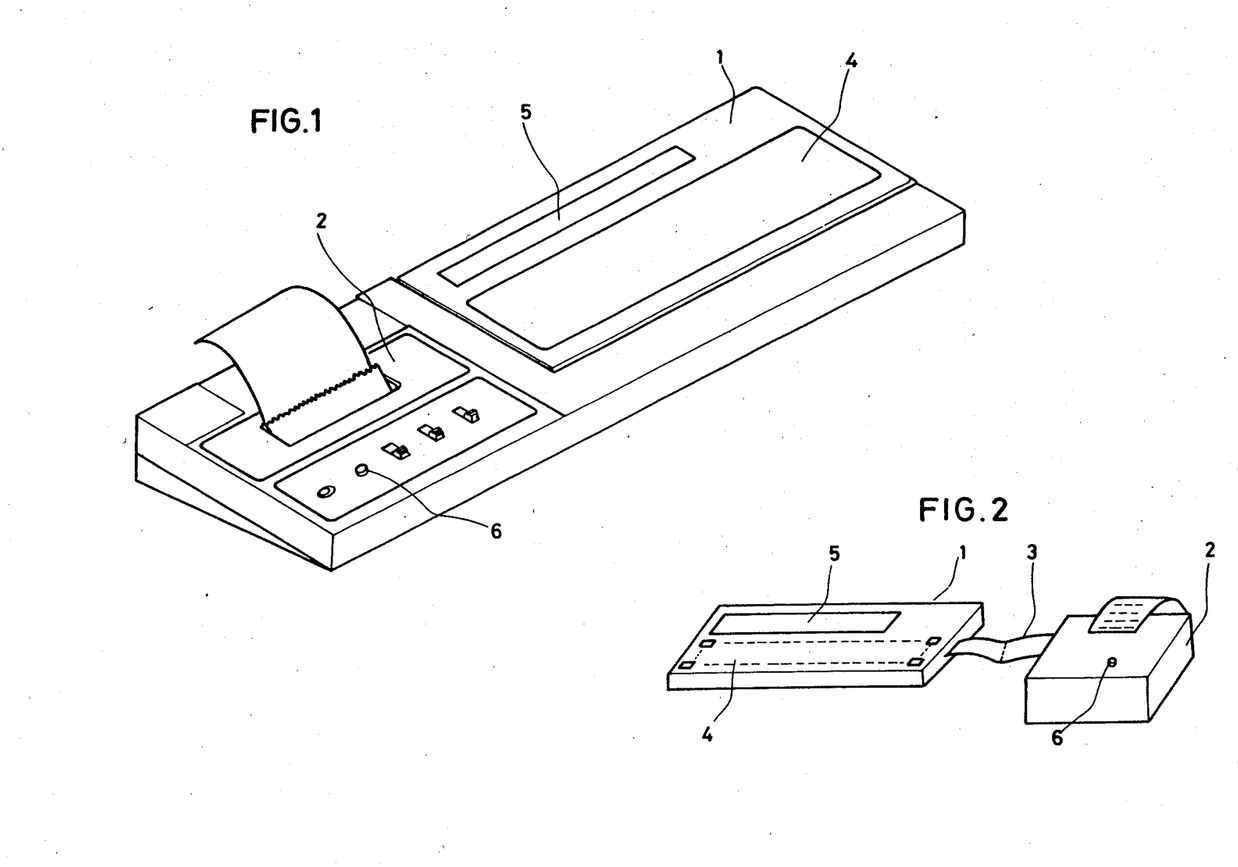
FIG. 1 shows an external view of an automatic graph printer as a preferred embodiment of the present invention.
FIG. 2 shows an external view of an automatic graph printer as another preferred embodiment of the present invention.

FIG. 1 shows an external view of an automatic graph printer as a preferred embodiment of the present invention, where the computer 1 and the graphic printer 2 are represented. Both are either integrated as a sole unit or conveniently and optionally combined together or detached from each other. The computer 1 is provided with a key unit 4 incorporating a key operation device and a display unit 5. By operating the key operation device, the computer 1 generates signals which cause the graph output printer 2 to generate a desired graph. FIG. 2 shows an example where the graph output printer 2 and the key operation device 4 of the computer 1 are detached from each other. Cable 3 connects both. The automatic graph printers shown in FIGS. 1 and 2 output any graph by means of the identical controls.

Figure 3:
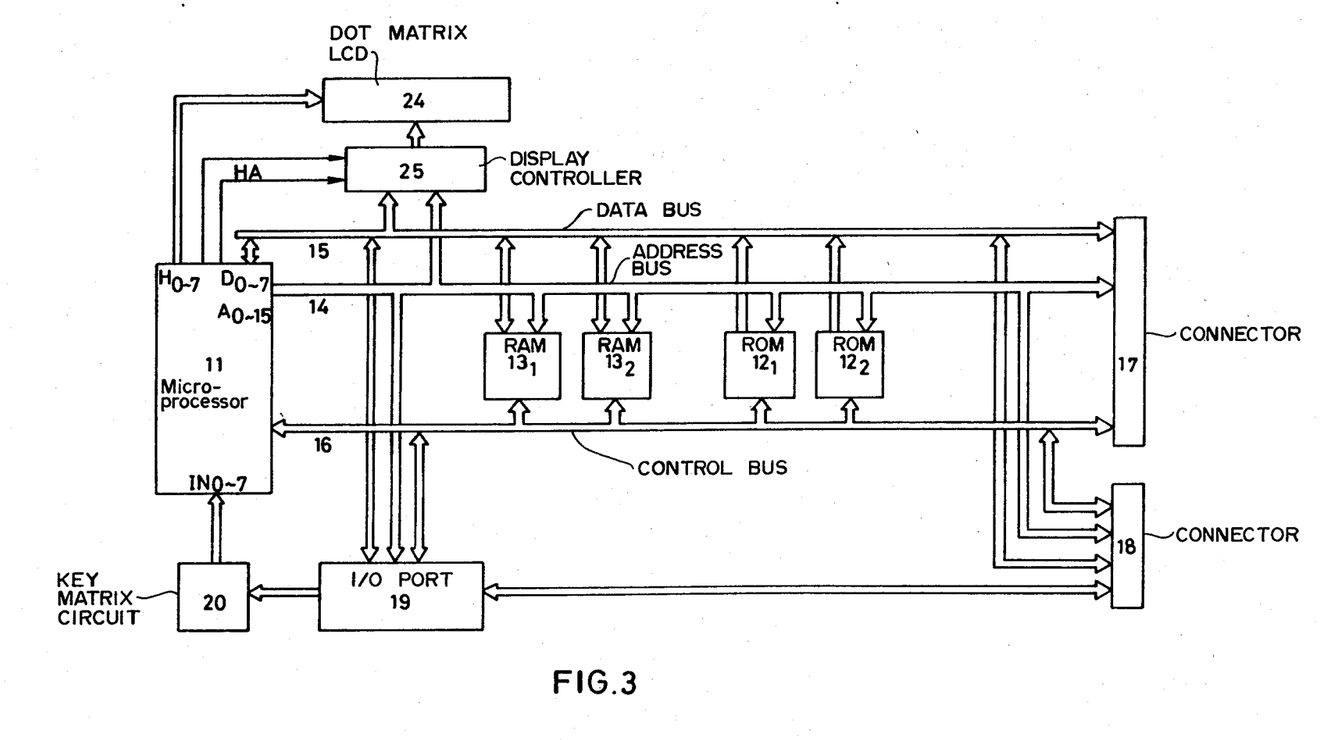
FIGS. 3 and 4 respectively show the schematic block diagram of the automatic graph printers shown in FIGS. 1 and 2 as the preferred embodiments of the present invention.
Figure 4:
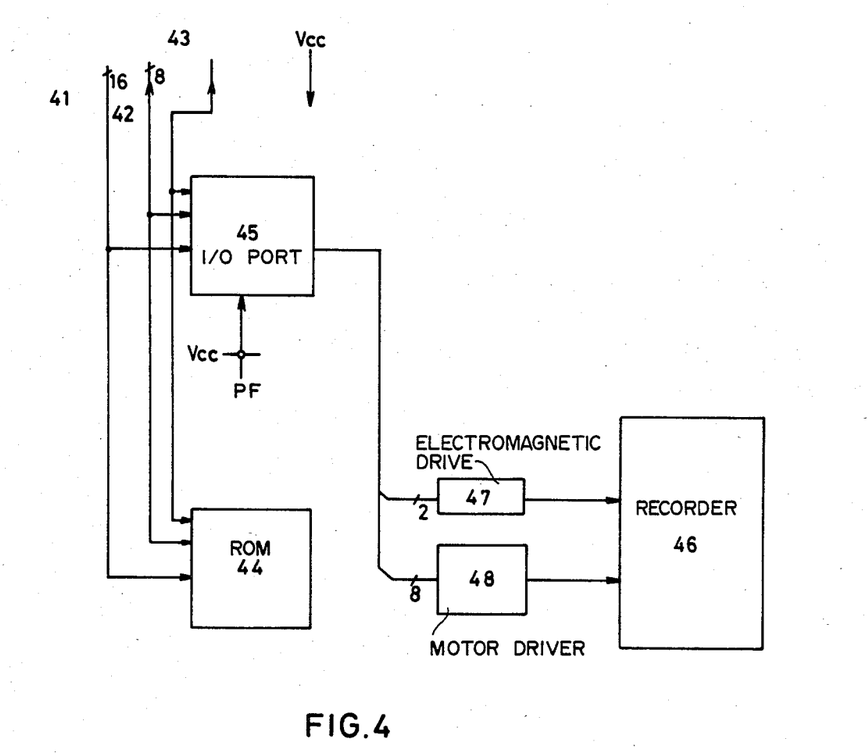

FIGS. 3 and 4 respectively show simplified block diagrams of the automatic graph printer as preferred embodiments of the present invention. In FIG. 3, the microprocessor 11, two of read-only memory ROM 12-1 and 12-2 memorizing programs representing control procedures, two of the random access memories (RAM) 13-1 and 13-2 available for reading and writing a variety of data as either the registers or flags, address bus 14, data bus 15, control bus 16, connector 17 connecting to external memories, and another connector 18 connecting to the plotter controller, are provided. I/O port 19 is connected to said address bus 14, data bus 15, and the control bus 16, through which it interfaces the microprocessor 11. Key matrix circuit 20 receives a key strobe signal from the I/O port 19 and outputs a return signal to the microprocessor 11. Dot matrix LCD 24 constitutes the display, while the display controller 25 outputs a display signal to the dot matrix LCD 24.

Figure 5:
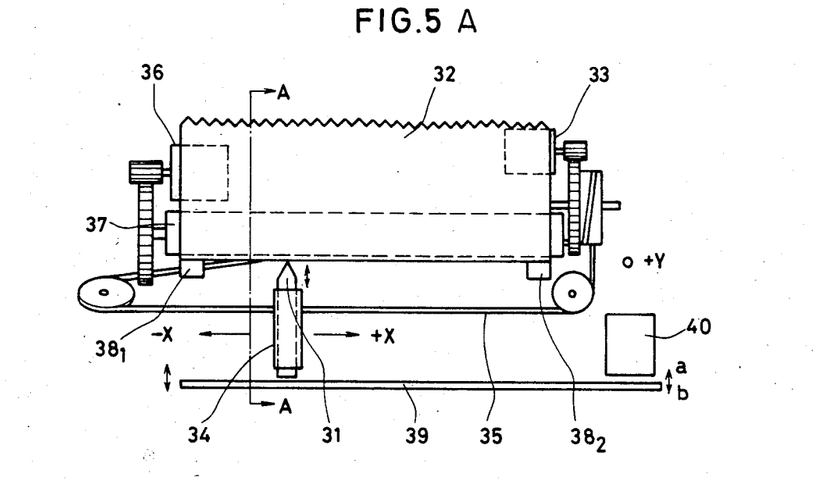
FIGS. 5A and 5B show a simplified diagram representing a construction of a pen recorder driven by the automatic printer control system of the present invention.

FIG. 4 shows the plotter system, where the address bus 41, data bus 42, and the control bus 43, are respectively connected to said address bus 14, data bus 15, and the control bus 16 through the connector 18 shown in FIG. 3. Read-only memory 44 memorizes the control programs governing the plotter instructions. In FIG. 4, symbol 45 represents the I/O port, 46 represents the recorder, 47 represents the electromagnet driving circuit, and 48 represents the driver circuit for motors 33 and 36 (refer to FIG. 5-1). PF is a paper forwarding signal output according to the paper forwarding key operation. The plotter controls basic lines such as the specified lateral or vertical lines so that they can be drawn from any designated positions for any length designated.

FIGS. 5A and 5B slow a simplified diagram of an exemplary recording device of the printer 2. FIG. 5A is a schematic plan view and 5B is a sectional view of a section A-A'. A ballpoint pen 31 moves in the direction of axis X, whereas the recording paper 32 moves in the direction of axis Y. If either the pen 31 or recording paper 32 moves while the pen 31 is being pressed against the paper 32, any of the intended lines can be drawn on the paper 32. A step motor 33 drives a belt 35 which is secured to a pen holder 34 which carries pen 31. Step motor 36 is connected by gears to a roller 37 that rotates responding to the rotation of the step motor 36. The recording paper 32 can be carried forward by rotation of the step motor 36 after it is inserted to a position between the roller 37 and additional rollers 38-1 and 38-2. A pressing part 39 presses the ballpoint pen 31 against the recording paper 32, which moves in the directions of a and b shown in the drawing in responding to the On/Off switching of a current flowing through an electromagnet 40. When said pressing part returns to the position shown in the drawing, the ballpoint pen 31 also returns to the original position. When the step motor 33 rotates one step, said ball point pen 31 moves by 0.2 mm, whereas when the step motor 36 rotates one step, said recording paper also moves by 0.2 mm. For example, if an instruction is given to draw 10 cm of a line in the horizontal direction, said ballpoint pen 31 is pressed against the recording paper 32, and then the motor 33 rotates 50 step turns. Whenever the motors 33 and 36 rotate, the position of said ballpoint pen 31 is detected by operating a position counter (not shown).

Figure 6A:
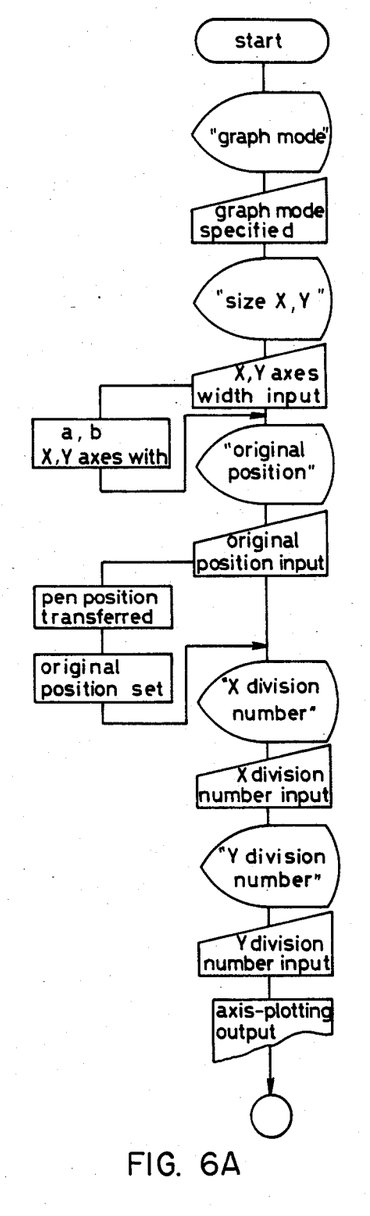
FIGS. 6A and 6B are a flowchart describing the control procedures implemented by the present invention for operating the recording device of FIGS. 5A and 5B.
Figure 6B:
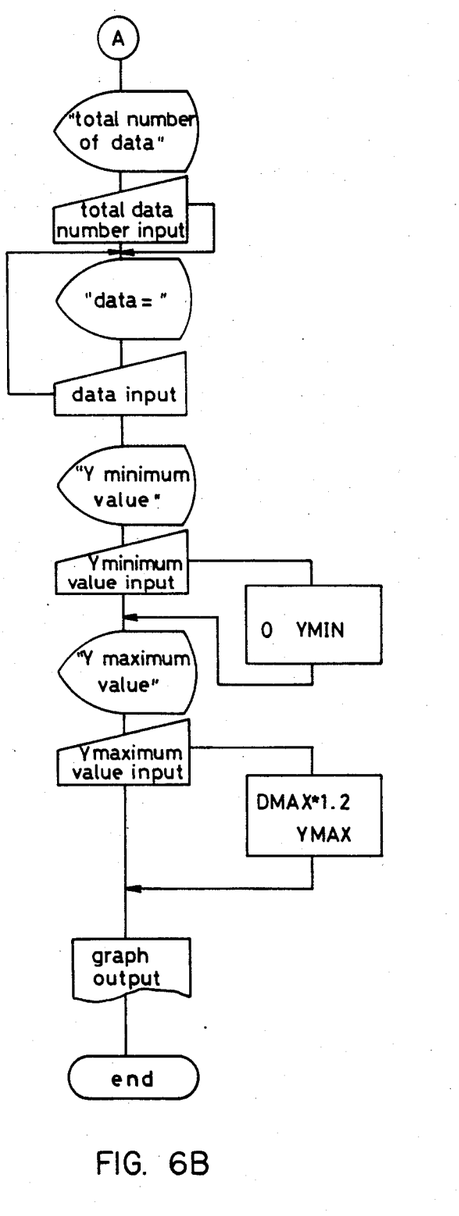

FIGS. 6A and 6B a flowchart describing the control procedures of the graphic printer embodied by the present invention. First, a display requesting a designation of an intended graph mode is executed, where such a designation includes either a line bar graph, or bar graph, and any of these modes can be entered by pressing the mode select key. Although not shown in FIGS. 6A and 6B, the designated mode is memorized by the set/reset operations of a flag that responds to the mode selected.

Next, an instruction to input the width of both the horizontal and vertical axes of an intended graph is given. Width of the axes can be input in the unit of mm. For example, if keys are operated so that "6", "0", ",", "8", "0", and "Input" are entered, 60 mm of the horizontal width and 80 mm of the vertical width can be set. If the widthwise designation is not executed, in other words, if only the "Input" key is pressed, values a and b stored as the stationary memory are output for entry. Next, a display requesting the designation of the original position is executed. Original position of the ballpoint pen 31 can be designated by first operating a key that drives the ballpoint pen 31 which is then stopped at any desired position, and by finally pressing the "original position" key.

The position of the ballpoint pen 31 is designated by operating either any of the keys "←", "↑", "→", "↓", or the paper forwarding key 6. If the original position of the ballpoint pen 31 is not designated during this step, said ballpoint pen is transferred to a pre-determined position, which is automatically designated as the original position. Said pre-determined position corresponds to a position where a graph having the largest width of the axis can be drawn, while said position is set in the lower left portion of the graph.

Figure 8:
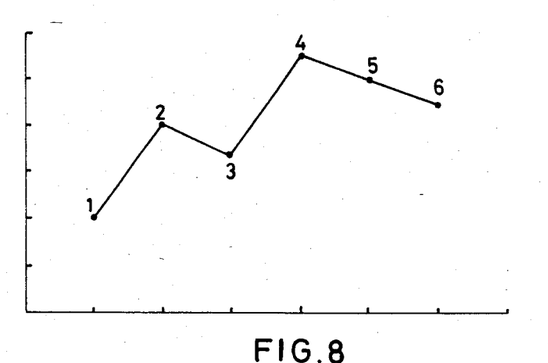
FIGS. 8 and 9, respectively, show exemplary graphs produced by the present invention including the respective X, Y axes with division lines thereon.
Figure 9:
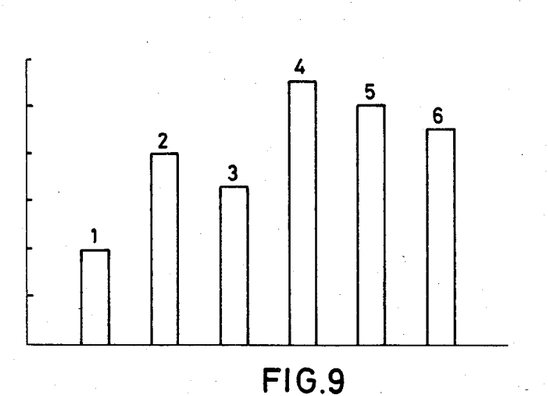

Next, a display requesting the designation of the division number of the horizontal axis of the graph is executed. Said division number represents the number of divisions of the axis as respectively shown in FIGS. 8 and 9. The division number can be designated by first operating the digital keys to set the needed numbers and finally pressing the "input" key. The division number of the vertical axis can also be designated in the same manner as above. Axis plotting operation can be executed by the procedures shown in FIG. 7 (1). Next, all the information related to data are entered with operating procedures shown in FIG. 6B from step (A) on. First, all the data are input. To execute such an operation, for example, as shown in FIGS. 8 and 9, 6 keys and "input" are pressed for designation, and then all the data values are sequentially input. After all of these are entered, the minimum value in the vertical axis, i.e., a value corresponding to the lower end of the vertical axis is designated.

Unless otherwise specified, zero (0) will be entered. The maximum value of the vertical axis, i.e., a value corresponding to the upper end of the vertical axis is designated in the same manner as above. Unless otherwise specified, an optimum value that has taken the input data into account is automatically entered. For example, for a variation of the data value, a value obtained by multiplying the maximum value by 1.2 is entered as the maximum of the vertical axis. After the information related to a variation of data is input, relevant graphic data is input. As described above, any desired graph can be drawn by merely operating relevant keys, and yet, it becomes also possible to draw any graphs having specific forms without necessarily designating such items which usually involving complex procedures in setting data.

Figure 7A:
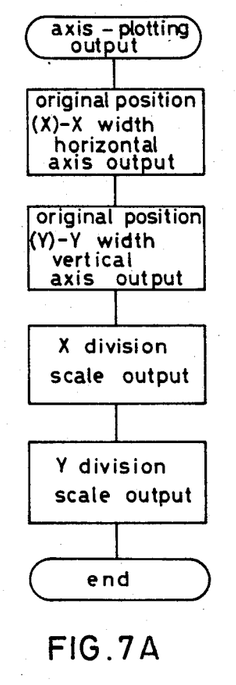
FIGS. 7A and 7B show a flowchart describing the control procedures of the axis plotting output and graphic output, the last steps of the flow charts of FIGS. 6A and 6B, respectively.
Figure 7B:
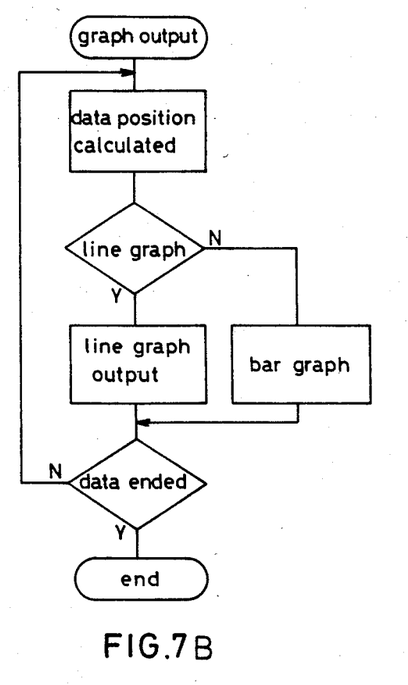

FIGS. 7A and 7B show flowcharts for controlling the axis plotting output routine and the graphic output routine, respectively. According to the original position designated and the value of the width of the horizontal axis, the axis plotting output routine draws a straight line for the horizontal axis. Likewise, according to the position Y of the original position and the value of the width for the vertical axis, the axis plotting output draws a straight line for the vertical axis. The axis plotting output routine then draws the division scales of the horizontal and vertical axis. Position of the division scale is calculated in accordance with the width of the axis and the value of the division number.

The graph output routine then calculates the position of the data of the graph according to the already input data value and the data related to other items, and then the graphic output eventually draws either line bars or bar graphs.

The position Y in the data position is determined by a formula $$DX\left(\frac{\text{width of the position } Y}{Y\max - Y\min}\right),$$

where D represents data. The position X is determined by calculating a formula $$\text{data number}\left(\frac{\text{width of the position } X}{\text{Total number of data}}\right).$$

The preferred embodiment described above automatically determines the maximum value of an axis according to the maximum value of a variety of sample data (or this can also be called the plot data being provided in a variety of portions of a graph). In addition to this, the preferred embodiment make it also possible to determine the minimum value of an axis in responding to the minimum value of a variety of sample data. The preferred embodiment primarily deal with a graph containing linear scales, however, depending on the sample data used, a logarithmic scale may be suitably used, and so either the linear or logarithmic scale can effectively and automatically be switched to each other, depending on the value of the sample data being applied.

The present invention has been thus described in reference to the preferred embodiments related thereto, however, it should be understood that various variations and modifications may be suggested to those skilled in the art, however, the present invention is not limitative of the spirit or scope of the following claims.

What is claimed is:

1. An automatic graphic printer comprising:
   input means for inputting scale information and sample data to be represented in the form of a diagram,
   a record medium positioned on said printer,
   a pen positioned on said printer,
   driving means for moving said record medium and said pen relative to each other,
   means for controlling said driving means,
   format control means for calculating scale information for X and Y axes from inputted sample data,
   said format control means determining the maximum value of the sample data for the Y axis and multiplying this value by a constant factor greater than 1 in order to obtain the maximum value of the Y axis.

2. An automatic graphic printer as defined in claim 1 wherein said driving means comprises step motors.

* * * * *